United States Patent Office 2,891,864
Patented June 23, 1959

2,891,864
VITAMIN E FORTIFIED ANIMAL FEEDS

James G. Baxter, Rochester, N.Y., assignor to Eastman Kodak Company, Rochester, N.Y., a corporation of New Jersey No Drawing. Application June 28, 1956
Serial No. 594,368

14 Claims. (Cl. 99—2)

The present invention relates to animal feed fortifying materials and animal feeds fortified therewith, and particularly to dry, free-flowing animal feeds fortified with vitamin E active material.

Animal feeds for such animals as chickens, ducks, turkeys, pheasants, hogs, cows, lambs, dogs, rabbits and numerous other animals are commonly fortified with various nutritional materials including vitamins.

The present invention concerns the fortification of dry, free-flowing animal feeds with vitamin E active material. Numerous animal nutritionists have reported that animals fed on feeds deficient in vitamin E active material tend to acquire various disorders such as encephalomalacia, enlarged hock disorder, symptoms of muscular dystrophy, myopathy of the gizzard and numerous other disorders. Accordingly, animal nutritionists have recommended that animal feeds be supplemented with a vitamin E active material.

It is thus an object of this invention to provide a novel animal feed fortified with a vitamin E active material.

It is another object of this invention to provide a novel feed supplement or concentrate suitable for uniformly blending with animal feeds to fortify said feeds with vitamin E active material.

It is another object of this invention to furnish an animal feed supplemented with an improved and readily prepared vitamin E active material.

It is an additional object of this invention to supply dry, free-flowing animal feeds fortified with stabilized vitamin E active material.

It is likewise an object of this invention to fortify animal feeds with a vitamin E active material derived from an industrial by-product.

It is a further object of this invention to provide economy and efficiency in the preparation of vitamin E fortified animal feeds.

These and other objects are accomplished by employing vegetable oil deodorizer sludges that have been directly acylated with lower acylating agents as a source of vitamin E active material in animal feeds.

Vegetable oil deodorizer sludges are by-products resulting from the refining of vegetable oils by deodorization with steam. After the steam has passed through the vegetable oil, it usually is condensed in a barometric condenser and the resulting condensate which contains deodorizer sludge and water permitted to flow into a sump or catch basin. The deodorizer sludge separates on the surface of the water and can be skimmed off. The deodorizer sludge also collects on the walls of the deodorization apparatus and can be recovered therefrom. Such by-products and their methods of preparation are discussed in U.S. Patent 2,349,269. In the art, deodorizer sludges are also called "hot-well scum," "hot-well oil," "lighter than water scum," "clabber stock," "condenser oil," "deodorizer trap oil," "catch basin scum," "shell drainings," and the like, all such materials being useable in this invention and included by the generic term "deodorizer sludge."

Deodorizer sludges derived from such tocopherol-containing vegetable oils as soybean oil, cottonseed oil, corn oil, safflower oil, sunflower seed oil, and similar tocopherol-containing oils can be employed in the present invention. Deodorizer sludges derived principally from soybean oil, cottonseed oil, or admixtures thereof, are preferably employed because of their high tocopherol content and ready commercial availability.

Vegetable oil deodorizer sludges are oleaginous compositions containing tocopherol materials, sterol materials, glyceride materials and free fatty acids as their main components. A typical deodorizer sludge, a deodorizer sludge derived from the steam deodorization of soybean oil, contains about 10% tocopherol material, about 20% sterol material, about 35% glyceride materials, about 25% free fatty acids and about 10% miscellaneous organic and inorganic materials by weight. However, the relative proportions of the components comprising deodorizer sludges can vary, such factors as the nature of the vegetable oil from which the sludge is derived, the type of deodorization treatment and the method used to collect the deodorizer sludge being variables largely determining the composition of the deodorizer sludge.

Vegetable oil deodorizer sludges suitable for use in the present invention contain from about 2% to about 15% total tocopherol material by weight. Such tocopherols as alpha-tocopherol, delta-tocopherol and gamma-tocopherol are the major tocopherol materials reported to be naturally occurring in the tocopherol components of common vegetable oils and deodorizer sludges derived therefrom. Alpha-tocopherol has the highest vitamin E biological activity and is thus the most important tocopherol material present in the deodorizer sludges employed in the present invention. A typical soybean oil deodorizer sludge containing about 10% total tocopherol material by weight has about 10% alpha-tocopherol, about 30% delta-tocopherol and about 60% gamma-tocopherol by weight in its tocopherol component. However, any vegetable oil deodorizer sludge containing more than about 1000 I. U. (International Units) of vitamin E per pound, which is equivalent to about 0.2% by weight alpha-tocopherol, can be suitably employed in the present invention. Some vegetable oil deodorizer sludges may contain as much as 15,000 I. U. of vitamin E per pound.

Deodorizer sludges derived from the steam deodorization of vegetable oils usually are in admixture with small amounts of water. The presence of water in the deodorizer sludge decomposes or consumes the lower acylating agents employed in the acylation treatment described in detail hereinbelow. Accordingly, the deodorizer sludge is preferably subjected to a drying treatment to remove susbtantially all of the water admixed or occluded therein prior to the present direct lower acylation treatment. A wide variety of the well-known drying methods can be used. One commonly employed method is to heat the crude sludge to its melting point, the water being heavier than the sludge is concentrated in the lower portions of the melt. Thus, sludge substantially free of water can be skimmed off the surface of the melt. A preferred method for preparing substantially dry or anhydrous deodorizer sludge is to subject the sludge to an azeotropic distillation with such organic solvents as benzene, isopropyl ether and the like in accordance with usual practice. However, any of the other well-known fatty material drying methods can also be suitably utilized.

Vegetable oil deodorizer sludges employed in the present invention are directly acylated with lower acylating agents without removing such materials as free sterols, sterol esters, free fatty acids, monoglycerides, diglycerides and triglycerides naturally present in deodorizer sludges, As used herein the term "lower acylating agent" refers to acyl halides, acid anhydrides and related acylating agents suitable for acylating or esterifying the tocopherol in deodorizer sludges with acyl groups having from two to four carbon atoms. Typical lower acylating agents that can be suitably employed are acetic anhydride, n-propionic anhydride, n-butyric anhydride, isobutyric anhydride, acetyl chloride, propionyl chloride, n-butyryl bromide, isopropenyl acetate, ketene and related lower acylating agents. Acetic anhydride is the preferred acylating agent for the present crude sludge compositions.

The tocopherols in vegetable oil deodorizer sludges are free tocopherols and the present lower acylation is effected to substantially completely acylate these tocopherols. In the course of the instant lower acylation treatment, other alcohol materials in the deodorizer sludge such as the free sterols are also incidentally acylated.

To facilitate the lower acylation of deodorizer sludges, such acylation catalysts as acetyl chloride, sodium acetate, hydrochloric acid, sulfuric acid, p-toluene sulfonic acid and the like are commonly employed in accordance with usual acylation practice, although the present lower acylation can be effected without such catalysts. The amount of catalyst material employed can be varied widely, with amounts of the magnitude of about 0.1%, or less, based on the weight of the deodorizer sludge being suitable, although amounts as high as 2% or even 5% can be used but are not usually necessary for good results.

Deodorizer sludges are usually solid or semi-solid compositions at room temperature, and thus, the present lower acylation reaction is effected at a temperature sufficient to melt or liquefy the deodorizer sludge, temperatures between about 35° C. and 150° C. being usually used to liquefy sludges as well as to facilitate the rate and effectiveness of the acylation. Any acylation reaction time sufficient to substantially completely acylate the tocopherol material in the sludge can be employed. While the duration of the acylation reaction period will vary with such factors as the catalyst, the temperature and the type of acylating agent, typical reaction periods are usually more than about fifteen minutes and less than about five hours. Excess lower acylating agents can be readily removed from the acylated sludge composition by distillation or related methods of separation, or simply by washing with water.

The resulting lower acylated deodorizer sludges can thereafter be substantially uniformly blended with or incorporated in dry, substantially inert, finely divided, solid carriers to form dry, free-flowing animal feed supplements or concentrates. Such supplements can thereafter be substantially uniformly blended with dry animal feed materials to prepare animal feeds fortified with vitamin E active material. Alternatively, lower acylated deodorizer sludges can be substantially uniformly blended directly with animal feeds to prepare the present fortified feed products.

A wide variety of dry, substantially inert carriers can be employed with the present lower acylated deodorizer sludges to prepare animal feed supplements. Such carriers as soy grits, wheat middlings, any of the cereal meals, ground alfalfa, ground magnesium carbonate, pumice, saw dust, ground corncobs, bone meal, ground oyster shells, and the like, or admixtures thereof, can be suitably utilized as carriers. The carriers are granulated or pulverized so as to be comprised essentially of finely divided particles, preferably between 10 and 100 mesh in size. (Mesh sizes used herein are the U.S. sieve series.) The lower acylated deodorizer sludges are blended with the carriers to make dry, free-flowing animal feed supplements suitable for admixture with other nutrient materials to prepare so-called "pre-mixes," or directly with animal feeds. Usually at least about five parts by weight of dry carrier materials such as soybean meal and the like are blended with each part by weight of lower acylated deodorizer sludge to prepare feed supplements for fortifying animal feeds although a wide range of proportions of sludges and carriers can be utilized. However, such feed supplements are commonly prepared for convenience in such concentrations of vitamin E active material that ½, 1, 5 or even 10 or more pounds of the supplement can be used to fortify a ton of animal feed with sufficient vitamin E active material for its intended use.

Also, the free fatty acids in high acid value deodorizer sludges can be converted into alkali metal or alkaline earth metal soaps, these soaps acting as carrier materials, or to complement the carriers described above. Free fatty acids comprise more than 50% by weight of the composition of some vegetable oil deodorizer sludges. The free fatty acids in such high acid value sludges can be neutralized to form soaps with such alkaline materials as potassium hydroxide, sodium hydroxide, calcium hydroxide or the like. To convert the free fatty acids in sludges to alkaline metal soaps, the sludges are preferably either partly or substantially wholly liquefied by adding water, organic solvents, or aqueous organic solvents, thereto to facilitate the reaction and to serve as reaction vehicles. Such solvents as methanol, isopropyl ether, diethyl ether, benzene, hexane, and the like can be used. Such vehicles can thereafter be readily removed by evaporation or distillation. Likewise, the free fatty acids in sludges can be converted to soaps by simply melting the sludge with an alkaline material. The addition of alkaline materials to deodorizer sludges, as well as serving to neutralize or convert free fatty acids present into soap carriers, also serves to decompose and neutralize unreacted or excess lower acylating agents and acidic catalyst materials if such materials have not been previously decomposed, removed or inactivated. The described alkaline treatment is to be distinguished from a saponification reaction, as the present reaction is effected so that substantially no saponification of esters occurs, and especially no saponification of the tocopheryl esters. Substantially stoichiometric amounts of alkaline material sufficient to neutralize the acidic materials in the lower acylated deodorizer sludge are preferably employed although alakline material in excess of stoichiometric amounts, or amounts sufficient to neutralize only part of the acidic materials, can be used. The resulting alkaline treated deodorizer sludge can thereafter be substantially uniformly blended with additional dry carrier materials to form feed supplements and feed premixes, or directly with animal feeds.

An important embodiment of the present invention comprises the use of hardened or hydrogenated fats and oils such as hydrogenated beef tallow, hydrogenated lard, hydrogenated cottonseed oil, hydrogenated soybean oil, hydrogenated corn oil, or the like, as carrier materials for lower acylated deodorizer sludges. Such fatty compositions can be prepared by melting lower acylated deodorizer sludges with such hardened fatty materials, solidifying the molten composition and thereafter mechanically granulating the resulting solidified material into small particle form, or by solidifying the molten composition directly into small particle form. Drum flakers are particularly suitable for solidifying such compositions, the flakes resulting therefrom being granulated and screened to a size suitable for blending with animal feeds. Also, molten compositions of lower acylated deodorizer sludges and hard fatty carriers can be spray chilled directly into small particle form, to wit, into beadlets of the desired size. Such small particle sizes suitable for use in animal feeds preferably range in size between about 10 mesh and 100 mesh, although smaller or larger particles may be desirable for certain special animal feeds. Usually at least two parts by weight of hardened fatty material is used as the carrier for each part by weight of lower acylated deodorizer sludge, although a wide range of proportions of fatty carriers and sludges can be utilized.

Any of the commonly used dry, free-flowing animal feeds can be fortified with the present lower acylated deodorizer sludge compositions, said sludge compositions being uniformly blended with animal feeds to substantially uniformly fortify the feed with lower acylated vitamin E active material. Such feeds are usually comprised essentially of mixtures of various meals, flours, seeds, grits, flakes, cereals, grains, and the like, such as alfalfa meal, yellow corn meal, corn gluten meal, cracked corn, oats, ground oats, crimped oats, wheat, ground wheat, wheat bran, soybean oil meal, soybean oil flakes, linseed oil meal, cottonseed meal, and related materials. In addition, commercially prepared dry animal feeds have added thereto minor proportionate amounts of minerals, antibiotics, vitamins, and special protein and carbohydrate materials such as calcium carbonate, dicalcium phosphate, iodized salt, copper sulfate, ferrous sulfate, manganese sulfate, niacin, choline chloride, aureomycin, terramycin, cobalt sulfate, dextrose, molasses, dried brewers' yeast, dried whey, vitamin A, vitamin D, etc. Also, small amounts of vitamin E active materials are preferably added to animal feeds to supplement any naturally occurring vitamin E active materials in animal feeds. The present lower acylated vegetable oil deodorizer sludge is employed in the present invention as a source of vitamin E active material for supplementing such animal feeds.

Lower acylated vegetable oil deodorizer sludges are eminently suited for fortifying dry, free-flowing animal feeds with vitamin E active material as the vitamin E active material in such sludges is particularly stable to oxidative destruction. Animal feeds are complicated mixtures of materials which contain numerous components such as enzymes, proteins and minerals, particularly such mineral components as manganese, copper and iron, which increase or catalyze the oxidation of vitamin E active materials therein. In addition, feeds are commonly stored at elevated temperatures under high humidities, such conditions tending to further destroy vitamin E active material in the feed. Thus, the stabilization of vitamin E active material in animal feeds is a formidable problem. However, animal feeds fortified with the instant lower acylated deodorizer sludge compositions will show very little loss of vitamin E active material even after more than six months of storage under normal feed storage conditions. Such carrier constituents as the above-described hydrogenated fats and oils, as well as the solid components naturally present in deodorizer sludges such as solid sterol and glyceride materials, envelope and protect a substantial proportion of the lower acyl tocopheryl material in the deodorizer sludge from direct contact with the components of animal feeds tending to augment oxidation of the lower acyl tocopheryl material. The tocopherol materials in vegetable oil deodorizer sludges that have not been subjected to the present lower acylation treatment are considerably more subject to oxidative destruction when admixed in animal feeds than the present lower acylated deodorizer sludges, and thus are not particularly suited for such applications and are to be distinguished from the present lower acylated deodorizer sludges.

The invention is illustrated by the following examples of preferred embodiments thereof.

EXAMPLE 1

A 100 g. sample of vegetable oil deodorizer sludge derived from the steam deodorization of soybean oil was dissolved in 500 ml. of freshly distilled and peroxide-free isopropyl ether and subjected to an azeotropic distillation to substantially dry the sample. Substantially all of the isopropyl ether was removed with substantially all of the water by the distillation which was effected at atmospheric pressure. The resulting azeotropically dried deodorizer sludge had a total tocopherol content of about 87 mg. of tocopherol per gram of deodorizer sludge and an alpha-tocopherol content of about 9 mg. of alpha-tocopherol per gram of deodorizer sludge. The deodorizer sludge also was comprised of about 25% free fatty acids, about 20% sterol materials and about 10% miscellaneous inorganic and organic materials by weight. A 50 g. portion of acetic anhydride and a 2 g. portion of acetyl chloride were thereafter added to the deodorizer sludge and the resulting mixture reacted for 1.5 hours at a temperature of 70°–80° C., other reactants being absent. Unreacted acetic anhydride was removed under vacuum in a stream of nitrogen from the resulting liquid reaction mixture before cooling. The reaction mixture thereafter was cooled into a thick semi-solid composition which had substantially no unesterified tocopherol as determined by Emmerie and Engel assay, and about 91 mg. of total tocopheryl acetate per gram of acetylated deodorizer sludge. One part by weight of the resulting acetylated deodorizer sludge composition was blended with about five parts by weight of soybean meal and screened to a 20 mesh to 60 mesh size to produce a dry, free-flowing animal feed supplement having substantial vitamin E activity. The acetylated deodorizer sludge-containing feed supplement thereafter is blended with a dry, free-flowing poultry feed at a ratio of about 1 part by weight of supplement to about 200 parts by weight of feed, the feed being comprised of the following constituents:

*Poultry feed*

| | |
|---|---|
| Yellow corn meal _____percent__ | 55.7 |
| Soybean oil meal _____do____ | 20.5 |
| Corn gluten meal _____do____ | 5.0 |
| Ground wheat _____do____ | 5.0 |
| Fish meal _____do____ | 4.0 |
| Dried whey _____do____ | 3.0 |
| Alfalfa leaf meal _____do____ | 2.5 |
| Calcium carbonate _____do____ | 1.25 |
| Dicalcium phosphate _____do____ | 1.25 |
| Distillers' molasses solubles _____do____ | 1.00 |
| Iodized salt _____do____ | .250 |
| Antibiotic supplement (3.6 g. aureomycin/lb.) percent__ | .125 |
| Vitamin A and D feeding oil _____do____ | .100 |
| Fermentation solubles _____do____ | .075 |
| Methionine _____do____ | .030 |
| Choline chloride _____do____ | .025 |
| Manganese sulfate _____do____ | .025 |
| 10% niacin supplement _____do____ | .020 |
| Vitamin $B_{12}$ supplement _____do____ | .020 |
| Nitrophanide _____do____ | .019 |
| D activated animal sterol_____g./ton of feed__ | 3.4 |
| Vitamin D _____I.U./lb. of feed__ | 306 |

The feed fortified with the acetylated deodorizer sludge is comprised of more than 5 I.U. of vitamin E active material per pound of feed. Substantially no loss of vitamin E active material can be detected after more than six months of storage of the above acetylated deodorizer sludge-supplemented feed at room temperature. Dry, free-flowing animal feeds fortified with vegetable oil deodorizer sludges acylated with such lower acylating agents as acetyl chloride and n-butyric anhydride show comparable properties.

EXAMPLE 2

A 500 g. sample of deodorizer sludge derived from the steam deodorization of a mixture of soybean oil and cottonseed oil, and which contained 8.98% total tocopherol of which about 15% was alpha-tocopherol and had an acid value of about 70, was dissolved in 1250 ml. of freshly distilled and peroxide-free isopropyl ether. Thereafter the isopropyl ether was distilled off to azeotropically dry the deodorizer sludge. To the resulting substantially anhydrous deodorizer sludge, were added about 60 g. of acetic anhydride and 5 g. of anhydrous sodium acetate. This mixture was placed on a steam bath and reacted for three hours. At the end of the reaction period, unreacted portions of the acetic anhydride were distilled off under vacuum in a stream of nitrogen. Substantially all of the tocopherol material in the starting material was found to have been converted into tocopheryl acetate. The resulting acetylated deodorizer sludge is thereafter melted with 2.5 kg. of hydrogenated beef tallow and then cooled and flaked on a drum flaker to provide a vitamin E supplement suitable for blending with animal feeds such as described in detail in Example 1. The flakes are granulated and screened to sizes of about 10 to 100 mesh. This vitamin E supplement is blended with animal feeds at a ratio of about three pounds of supplement to a ton of feed. In lieu of solidifying the molten mixture of acetylated deodorizer sludges and beef tallow on a drum flaker, this molten mixture can be spray chilled into beadlets, beadlets ranging in size from about 10 to 100 mesh being particularly suited for blending with dry, free-flowing animal feeds. The vitamin E active material in the beef tallow carrier is stable when blended with animal feeds such as described in Example 1, the vitamin E active material being enveloped and protected by the beef tallow carrier from direct contact with the constituents in the feeds tending to augment oxidation such as certain minerals, proteins, enzymes, etc.

EXAMPLE 3

A deodorizer sludge derived from the steam deodorization of cottonseed oil having a total tocopherol content of about 6.3% by weight, an alpha-tocopherol content of about 3% by weight and an acid value of about 125 is dried by azeotropic distillation and acetylated with acetic anhydride in the same manner as in Example 1. Substantially all of the unreacted acetic anhydride is removed by distillation under vacuum in a stream of nitrogen. The resulting acetylated deodorizer sludge is admixed with about two times its weight of aqueous methanol and a substantially stoichiometric amount of aqueous calcium hydroxide sufficient to neutralize the acid material in the acetylated composition and to form calcium soaps of the free fatty acids naturally occurring in the deodorizer sludge. The aqueous solvent is thereafter removed by distillation under vacuum in a stream of nitrogen to produce a dark brown solid composition. The resulting solid composition is thereafter granulated to a size of about 20 to 60 mesh and substantially uniformly incorporated into a dry, free-flowing animal feed such as described in detail in Example 1 to fortify the feed with at least about 3 I.U. of vitamin E per pound of feed.

EXAMPLE 4

A 100 g. sample of substantially dry deodorizer sludge derived from the steam deodorization of soybean oil and having a total tocopherol content of 82 mg. of tocopherol per gram of deodorizer sludge and an alpha-tocopherol content of 8.3 mg. of alpha-tocopherol per gram of deodorizer sludge is combined with about 75 g. of n-butyric anhydride and 2 g. of anhydrous sodium acetate. The tocopherol in the resulting mixture is substantially completely converted to tocopheryl butyrate esters by heating the mixture for about two hours at 135° C., excess n-butyric anhydride thereafter being removed under vacuum in a stream of nitrogen. The resulting butyrated deodorizer sludge composition is a semi-liquid composition having substantial vitamin E activity. The butyrated deodorizer sludge is melted and substantially uniformly sprayed on the animal feed described in Example 1 at a ratio of about 1 part by weight of butyrated deodorizer sludge to about 500 parts by weight of animal feed.

Thus, the present invention provides a practical and economical means for preparing vitamin E active supplements for animal feeds from by-products or waste products from another process, namely, from the steam deodorization of vegetable oils. Further, the instant lower acylation treatment is simple and can be readily effected without the necessity for complicated processing equipment. Also, the lower acylation treatment is effected directly on the deodorizer sludge without prior costly and time consuming refining steps such as saponification, distillation, wintering, solvent extraction, alcoholysis, and similar steps commonly used in the processing of fatty materials. Additionally, the vitamin E active material in the resulting lower acylated sludge has high stability when incorporated in animal feeds. Accordingly, the present invention is of significance in the art as a relatively inexpensive crude by-product can be processed by comparatively simple means to produce an improved product having great utility.

While the invention has been described in considerable detail with reference to certain preferred embodiments thereof, it will be understood that variations and modifications can be effected within the spirit and scope of the invention as described hereinabove and as defined in the apended claims.

I claim:

1. A composition for use in fortifying animal feeds comprising vitamin E active material prepared from a vegetable oil deodorizer sludge containing at least 0.2% by weight alpha-tocopherol by subjecting said deodorizer sludge under substantially anhydrous conditions to a lower acylation reaction effective to convert substantially all of the free tocopherol material in said deodorizer sludge to lower acyl tocopheryl esters, said lower acylation reaction being effected directly on said deodorizer sludge without removal of sterol materials, glyceride materials and free fatty acids naturally present in said deodorizer sludge, the said lower acylated deodorizer sludge being substantially uniformly blended with a dry, substantially inert, solid, and finely divided carrier material.

2. A dry, free-flowing animal feed substantially uniformly fortified with a vitamin E active composition prepared from a vegetable oil deodorizer sludge containing at least 0.2% by weight alpha-tocopherol by subjecting said deodorizer sludge under substantially anhydrous conditions to a lower acylation reaction effective to convert substantially all of the free tocopherol material in said deodorizer sludge to lower acyl tocopheryl esters, said lower acylation reaction being effected directly on said deodorizer sludge without removal of sterol materials, glyceride materials and free fatty acids naturally present in said deodorizer sludge.

3. A composition for use in fortifying animal feeds comprising vitamin E active material prepared from a vegetable oil deodorizer sludge containing at least 0.2% by weight alpha-tocopherol by acetylating said deodorizer sludge under substantially anhydrous conditions to convert substantially all of the free tocopherol material in said deodorizer sludge to tocopheryl acetate, said acetylating being effected directly on said deodorizer sludge without removal of sterol materials, glyceride materials and free fatty acids naturally present in said deodorizer sludge, the said acetylated deodorizer sludge being substantially uniformly blended with a dry, substantially inert, solid carrier material comprised essentially of finely divided material between about 10 mesh and about 100 mesh in size.

4. A dry, free-flowing animal feed substantially uniformly fortified with a vitamin E active composition prepared from a vegetable oil deodorizer sludge containing at least 0.2% by weight alpha-tocopherol by acetylating said deodorizer sludge under substantially anhydrous conditions to convert substantially all of the free tocopherol material in said deodorizer sludge to tocopheryl acetate, said acetylating being effected directly on said deodorizer sludge without removal of sterol materials, glyceride materials and free fatty acids naturally present in said deodorizer sludge.

5. A composition for use in fortifying animal feeds comprising vitamin E active material prepared from a deodorizer sludge resulting from the steam deodorization of a vegetable oil selected from the group consisting of soybean oil, cottonseed oil and mixtures of soybean oil and cottonseed oil, and which contains at least 0.2% by weight alpha-tocopherol, by reacting said deodorizer sludge under substantially anhydrous conditions with acetic anhydride to convert substantially all of the free tocopherol material in said deodorizer sludge to tocopheryl acetate, said reacting being effected directly on said deodorizer sludge without removal of sterol materials, glyceride materials and free fatty acids naturally present in said deodorizer sludge, the said acetylated deodorizer sludge being substantially uniformly blended with a dry, substantially inert, solid carrier material comprised essentially of finely divided material between about 10 mesh and about 100 mesh in size.

6. A composition for use in fortifying animal feeds as defined in claim 5 wherein the said carrier material is soybean meal.

7. A dry, free-flowing animal feed substantially uniformly fortified with a vitamin E active composition prepared from a deodorizer sludge resulting from the steam deodorization of a vegetable oil selected from the group consisting of soybean oil, cottonseed oil and mixtures of soybean oil and cottonseed oil, and which contains at least 0.2% by weight alpha-tocopherol, by reacting said deodorizer sludge under substantially anhydrous conditions with acetic anhydride to convert substantially all of the free tocopherol material in said deodorizer sludge to tocopheryl acetate, said reacting being effected directly on said deodorizer sludge without removal of sterol materials, glyceride materials and free fatty acids naturally present in said deodorizer sludge, the said acetylated deodorizer sludge being substantially uniformly blended with a dry, substantially inert, solid carrier material comprised essentially of finely divided material between about 10 mesh and about 100 mesh in size.

8. A dry, free-flowing, finely divided composition essentially about 10 mesh to about 100 mesh in size and suitable for fortifying animal feeds with vitamin E active material and being comprised of a composition containing at least 0.2% by weight alpha-tocopheryl acetate incorporated in a solid carrier material selected from the group consisting of hydrogenated fats and hydrogenated oils, the said animal feed fortifying material being prepared by reacting a vegetable oil deodorizer sludge under substantially anhydrous conditions with acetic anhydride to convert substantially all of the free tocopherol material in said deodorizer sludge to tocopheryl acetate, said reacting being effected directly on said deodorizer sludge without removal of sterol materials, glyceride materials and free fatty acids naturally present in said deodorizer sludge, and then melting the resulting acetylated deodorizer sludge with said solid carrier material, and thereafter solidifying the resulting molten composition and thereby forming the said dry, free-flowing, finely divided fortifying material.

9. A dry, free-flowing composition as defined in claim 8 wherein the said carrier material is hydrogenated beef tallow.

10. A dry, free-flowing animal feed substantially uniformly fortified with the product of claim 8.

11. A dry, free-flowing, finely divided composition suitable for fortifying animal feeds with vitamin E active material comprising a composition containing at least 0.2% by weight alpha-tocopheryl acetate and a major proportionate amount of fatty acid soaps, the said animal feed fortifying material being prepared by reacting a vegetable oil deodorizer sludge containing at least 50% by weight free fatty acids under substantially anhydrous conditions with acetic anhydride to convert substantially all of the free tocopherol in said deodorizer sludge to tocopheryl acetate, said reacting being effected directly on said deodorizer sludge without removal of sterol materials, glyceride materials and free fatty acids naturally present in said deodorizer sludge, and thereafter converting substantially all of the free fatty acids in said sludge to soaps of an alkaline metal selected from the group consisting of alkali metals and alkaline earth metals.

12. A dry, free-flowing animal feed substantially uniformly fortified with the product of claim 11.

13. A dry, free-flowing, finely divided composition suitable for fortifying animal feeds with vitamin E active materials comprising a composition containing at least 0.2% by weight of a lower acyl alpha-tocopheryl ester and a substantial amount of fatty acid soaps, the said animal feed fortifying material being prepared by subjecting a vegetable oil deodorizer sludge containing a substantial amount of free fatty acids under substantially anhydrous conditions to a lower acylation reaction effective to convert substantially all of the free tocopherol in said deodorizer sludge to lower acyl tocopheryl esters, the said acylation being effected directly on said deodorizer sludge without removal of sterol materials, glyceride materials and free fatty acids naturally present in said deodorizer sludge, and thereafter converting all of the free fatty acids in said sludge to soaps of an alkaline metal selected from the group consisting of alkali metals and alkaline earth metals.

14. A dry, free-flowing animal feed substantially uniformly fortified with the product of claim 13.

References Cited in the file of this patent

UNITED STATES PATENTS

| | | |
|---|---|---|
| 2,349,271 | Baxter | May 23, 1944 |
| 2,349,590 | Hickman | May 23, 1944 |
| 2,496,634 | Melnick | Feb. 7, 1950 |